(12) United States Patent
Beringer et al.

(10) Patent No.: US 7,720,857 B2
(45) Date of Patent: *May 18, 2010

(54) METHOD AND SYSTEM FOR PROVIDING AN INVISIBLE ATTRACTOR IN A PREDETERMINED SECTOR, WHICH ATTRACTS A SUBSET OF ENTITIES DEPENDING ON AN ENTITY TYPE

(75) Inventors: Joerg Beringer, Frankfurt (DE);
Michael Hatscher, Osnabruck (DE);
Horst Werner, Rettigheim (DE)

(73) Assignee: SAP AG, Walldorf (DE)

( * ) Notice: Subject to any disclaimer, the term of this patent is extended or adjusted under 35 U.S.C. 154(b) by 459 days.

This patent is subject to a terminal disclaimer.

(21) Appl. No.: 10/927,316

(22) Filed: Aug. 27, 2004

(65) Prior Publication Data
US 2005/0114384 A1 May 26, 2005

(30) Foreign Application Priority Data
Aug. 29, 2003 (EP) .................... 03077697
Nov. 14, 2003 (EP) .................... 03078585

(51) Int. Cl.
G06F 17/30 (2006.01)
G06F 3/048 (2006.01)
G09G 5/02 (2006.01)
G06F 9/44 (2006.01)

(52) U.S. Cl. .............. 707/766; 707/778; 707/798; 715/853; 345/676; 717/125

(58) Field of Classification Search ............. 345/672, 345/427, 440, 676, 679–681; 707/1–4, 7, 707/100, 102, 104.1, 200, 709–710, 713, 707/716, 731, 757–758, 766, 777–778, 797–798, 707/920, 956; 715/273, 700, 713, 762–763, 715/853–854, 779; 717/105, 125
See application file for complete search history.

(56) References Cited

U.S. PATENT DOCUMENTS 5,590,250 A 12/1996 Lamping et al.

(Continued)

FOREIGN PATENT DOCUMENTS

EP 1050829 A2 11/2000

(Continued)

OTHER PUBLICATIONS

Fluit et al. ("Ontology-based Information Visualisation", Springer Verlag, 2002, retrieved from http://www.cs.vu.nl/~frankh/abstracts/VSW02.html, on Jan. 18, 2007).*

(Continued)

Primary Examiner—Srirama Channavajjala
(74) Attorney, Agent, or Firm—Finnegan, Henderson, Farabow, Garrett & Dunner, LLP (57) ABSTRACT

A visualization graph is provided on a computer by storing data corresponding to a plurality of entities having a particular type, wherein a semantic net includes the entities and wherein the entities are linked to each other by a plurality of relations. The visualization graph is provided in response to a query with respect to an entity selected from the plurality of entities, wherein the visualization graph includes a plurality of sectors representing the results of the query. Entities are allocated to a predetermined sector of the graph depending on their entity type.

20 Claims, 9 Drawing Sheets

U.S. PATENT DOCUMENTS

| | | | |
|---|---|---|---|
| 5,619,632 A | 4/1997 | Lamping et al. | |
| 5,740,440 A | 4/1998 | West | |
| 5,777,622 A * | 7/1998 | Lehr | 345/428 |
| 6,144,962 A | 11/2000 | Weinberg et al. | |
| 6,154,213 A | 11/2000 | Strausfeld et al. | |
| 6,154,220 A | 11/2000 | Xiaoing et al. | |
| 6,216,134 B1 | 4/2001 | Heckerman et al. | |
| 6,263,339 B1 * | 7/2001 | Hirsch | 707/102 |
| 6,266,805 B1 | 7/2001 | Nwana et al. | |
| 6,285,951 B1 | 9/2001 | Gaskins et al. | |
| 6,356,285 B1 | 3/2002 | Burkwald et al. | |
| 6,369,819 B1 | 4/2002 | Pitkow et al. | |
| 6,373,484 B1 | 4/2002 | Orell et al. | |
| 6,377,287 B1 * | 4/2002 | Hao et al. | 715/853 |
| 6,434,556 B1 | 8/2002 | Levin et al. | |
| 6,480,843 B2 | 11/2002 | Li | |
| 6,496,832 B2 * | 12/2002 | Chi et al. | 707/102 |
| 6,556,983 B1 | 4/2003 | Altschuler et al. | |
| 6,583,794 B1 * | 6/2003 | Wattenberg | 715/708 |
| 6,646,652 B2 | 11/2003 | Card et al. | |
| 6,654,761 B2 | 11/2003 | Tenev et al. | |
| 6,714,936 B1 | 3/2004 | Nevin, III | |
| 6,789,054 B1 * | 9/2004 | Makhlouf | 703/6 |
| 6,792,400 B2 * | 9/2004 | Alden et al. | 703/2 |
| 6,795,825 B2 | 9/2004 | Rishe | |
| 6,868,525 B1 | 3/2005 | Szabo | |
| 6,888,548 B1 * | 5/2005 | Gallivan | 345/440 |
| 6,897,885 B1 * | 5/2005 | Hao et al. | 715/853 |
| 6,901,555 B2 | 5/2005 | Hida et al. | |
| 6,981,228 B1 | 12/2005 | Chen et al. | |
| 7,089,266 B2 | 8/2006 | Stolte et al. | |
| 7,167,865 B1 * | 1/2007 | Tharp et al. | 707/100 |
| 7,203,701 B1 | 4/2007 | Packebush et al. | |
| 7,421,665 B2 | 9/2008 | Molesky et al. | |
| 7,468,727 B2 | 12/2008 | Wong et al. | |
| 7,549,309 B2 * | 6/2009 | Beringer et al. | 70/102 |
| 7,574,659 B2 * | 8/2009 | Szabo | 715/738 |
| 7,617,185 B2 * | 11/2009 | Werner et al. | 707/3 |
| 2002/0087275 A1 | 7/2002 | Kim et al. | |
| 2002/0130907 A1 | 9/2002 | Chi et al. | |
| 2002/0133392 A1 | 9/2002 | Angel et al. | |
| 2002/0154175 A1 | 10/2002 | Abello et al. | |
| 2002/0158918 A1 | 10/2002 | Feibush et al. | |
| 2002/0196292 A1 | 12/2002 | Itoh et al. | |
| 2003/0011601 A1 | 1/2003 | Itoh et al. | |
| 2003/0085931 A1 | 5/2003 | Card et al. | |
| 2003/0167324 A1 * | 9/2003 | Farnham et al. | 709/224 |
| 2003/0220928 A1 | 11/2003 | Durand et al. | |
| 2004/0024533 A1 | 2/2004 | Ohta | |
| 2004/0030741 A1 | 2/2004 | Wolton et al. | |
| 2004/0059521 A1 | 3/2004 | Han et al. | |
| 2004/0088678 A1 | 5/2004 | Litoiu et al. | |
| 2004/0111255 A1 | 6/2004 | Huerta et al. | |
| 2004/0113953 A1 | 6/2004 | Newman | |
| 2004/0133433 A1 | 7/2004 | Lee et al. | |
| 2004/0150644 A1 | 8/2004 | Kincaid et al. | |
| 2004/0243938 A1 | 12/2004 | Weise et al. | |
| 2005/0114802 A1 * | 5/2005 | Beringer et al. | 715/968 |
| 2005/0116953 A1 * | 6/2005 | Liongosari et al. | 345/440 |
| 2006/0037019 A1 * | 2/2006 | Austin et al. | 718/100 |
| 2006/0044319 A1 | 3/2006 | Molesky et al. | |
| 2006/0106847 A1 | 5/2006 | Eckardt et al. | |
| 2006/0288311 A1 * | 12/2006 | Heer et al. | 715/853 |
| 2007/0124291 A1 | 5/2007 | Hassan et al. | |
| 2009/0265324 A1 * | 10/2009 | Mordvinov et al. | 707/4 |

FOREIGN PATENT DOCUMENTS

| | | |
|---|---|---|
| WO | WO 92/11724 | 7/1992 |
| WO | WO 01/88751 | 11/2001 |
| WO | WO 02/069192 | 9/2002 |
| WO | WO 03/069506 | 8/2003 |
| WO | WO 2007/062885 | 6/2007 |

OTHER PUBLICATIONS

Nihar Sheth et al. "Visualizing MeSH Dataset using Radial Tree Layout", Published on Apr. 29, 2003, pp. 1-11.*

Ming C Hao et al. [hereafter Ming], Web-based visualization of large hierarchical graphs using invisible links in a Hyperbolic space, HP Lab. published on Jan. 2000.*

Sonia Fernandes Silva et al. "Formalizing visual interaction withh istorical databases", Information Systems 27 (2002) 487-521.*

Edward PF Chan et al. "On multi-scale display of geometric objects", Data and Knowledge Engineering, 40 (2002)91-119.*

U.S. Appl. No. 10/927,313, filed Aug. 27, 2004, entitled "Methods and Systems for Providing a Visualization Graph."

U.S. Appl. No. 10/927,315, filed Aug. 27, 2004, entitled "Methods and Systems for Providing a Visualization Graph."

U.S. Appl. No. 10/927,458, filed Aug. 27, 2004, entitled "Methods and Systems for Providing a Visualization Graph."

Herman et al., "Graph Visualization and Navigation in Information Visualization: A Survey," IEEE, Jan.-Mar. 2000, pp. 24-43.

"Chapter 15: Topic Maps in Knowledge Organization," Jul. 16, 2002, XML Topic Maps: Creating and Using Topic Maps for the Web, Addison Wesley Professional, 43 pages.

Baumgartner, Jason L., et al., "Roget2000: A 2D Hyperbolic Tree Visualization of Roget's Thesaurus," SPIE Conference on Visualization and Data Analysis, Jan. 2002, pp. 1-8.

Butler, Greg et al., "A Graph Database With Visual Queries for Genomics," Proceedings Trim Size: 9.75 in x 6.5 in., Sep. 28, 2004, 10 pages.

Communication from the EPO, dated Jan. 16, 2007 for European Application No. 03 078 583.6-1225, 8 pages.

Communication from the EPO, dated Jan. 17, 2007 for European Application No. 03 078 584.4-1225, 8 pages.

Communication from the EPO, dated Jan. 17, 2007 for European Application No. 03 078 586.9-1225, 8 pages.

Communication from the EPO, dated Jan. 19, 2009 for European Application No. 03 078 583.6-2221, 9 pages.

Communication from the EPO, dated Jan. 20, 2009 for European Application No. 03 077 697.5-2221, 9 pages.

Communication from the EPO, dated Jan. 20, 2009 for European Application No. 03 078 584.4-2221, 10 pages.

Communication from the EPO, dated Jan. 20, 2009 for European Application No. 03 078 585.1-2221, 9 pages.

Communication from the EPO, dated Jan. 20, 2009 for European Application No. 03 078 586.9-2221, 9 pages.

Communication from the EPO, dated Jul. 5, 2004 for European Application No. 03 078 585.1-1225, 4 pages.

Communication from the EPO, dated Nov. 8, 2006 for European Application No. 03 078 585.1-1225, 9 pages.

Communication from the EPO, dated Oct. 26, 2006 for European Application No. 03 077 697.5-1225, 6 pages.

Gansner, Emden R., et al., "An open graph visualization system and its applications to software engineering," Prepared using speauth.cls [Version: 1999/06/11 v1. 1a], Software-Practice and Experience, 1999, pp. 1-29.

Golovchinsky, G. et al., "Subverting structure: data-driven diagram generation," Visualization, 1995, Visualization '95. Proceedings, IEEE Conference in Atlanta, Georgia, Oct. 29-Nov. 3, 1995, Los Alamitos, California, pp. 217-223.

Groth, Dennis P., "Visual Representation of Database Queries Using Structural Similarity," Proceedings of the Seventh International Conference on Information Visualization (Iv'03), 2003, IEEE, 6 pages.

Halin, Gilles, "An interactive graph visualization for handling cooperative design activity context," The 11th International Conference on CSCW in Design, Melbourne, Australia, 2007, pp. 1-5.

Huang, Mao Lin, "Information Visualization of Attributed Relational Data," 2001, Australian Computer Society, Inc. This paper appeared at the Australian Symposium on Information Visualization, Sydney, Dec. 2001. Conferences in Research and Practice in Information Technology, vol. 9, 7 pages.

Hull, R. et al., "Semantic database modeling: survey, applications and research issues," ACM Computing Surveys, ACM, New York, NY, Sep. 1, 1987, pp. 201-260.

Lamping, John et al., "A Focus + Context Technique Based on Hyperbolic Geometry for Visualizing Large Hierarchies," Proceedings of the ACM SIGCHI Conference on Human Factors in Computing Systems, Denver, May 1995, ACM., pp. 1-8.

Marshall, Scott, "Methods and Tools for the Visualization and Navigation of Graphs," 2001, Universite Bordeau 1, Bordeaux, France, 78 pages.

Moreland, Kenneth et al., "Massive Graph Visualization: LDRD Final Report," Oct. 2007, 48 pages.

Mutton, Paul et al., "Visualization of Semantic Metadata and Ontologies," Proceedings of the Seventh International Conference on Information Visualization (IV'03), 2003, IEEE, 6 pages.

Nguyen, Quant Vinh, et al., "A space-optimized tree visualization," Information Visualization, 2002, INFOVIS 2002, IEEE Symposium, Oct. 28-29, 2002, 8 pages.

Partial European Search Report for European Application No. 03 077 697.5-1225, dated Jun. 18, 2004, 5 pages.

Staszak, C., "Semantic Network Picture Book," 2002, pp. 1-14.

Wills, Graham J., "NicheWorks—Interactive Visualization of Very Large Graphs," 1999, pp. 190-212, XP007906624, Retrieved from the Internet: URL:http://www.amstat.org/Publications/jcgs/pdf99/wills.pdf>.

* cited by examiner

METHOD AND SYSTEM FOR PROVIDING AN INVISIBLE ATTRACTOR IN A PREDETERMINED SECTOR, WHICH ATTRACTS A SUBSET OF ENTITIES DEPENDING ON AN ENTITY TYPE

This application is based upon and claims the benefit of priority from prior patent application EP 03077697.5, filed Aug. 29, 2003, and prior patent application EP 03078585.1, filed Nov. 14, 2003, the entire contents of each which are expressly incorporated herein by reference.

BACKGROUND

I. Technical Field

The present invention relates to a methods and systems for providing a visualization graph on a computer.

II. Background Information

Visualization graphs are tools that allow data to be handled and displayed on a display device according to certain criteria. The primary objective of navigation graphs is to display systems of complex interrelationships between entities, such as in a database or on the World Wide Web. Visualization graphs can be based on a semantic net including all entity types that occur where the considered entities are linked to each other by various kinds of relations. A visualization graph represents entities as boxes, often referred to as "nodes" of the graph, and relations as lines between the boxes.

A common way of solving the problem of graphical layout is to apply a physical simulation where all entities are treated as masses repulsing each other and the relations are treated as elastic lines trying to pull connected entities together. By double-clicking on a box, other entities that are directly related to the corresponding entity (but which may not yet in the graph) and their relations to other entities in the graph are included. In some implementations the double-clicked entity then moves to the center of the graph (it becomes the "focus" entity) and other nodes, which are too distant (measured in number of relations on the shortest path) from it are removed from the graph.

However, conventional visualization graphs suffer drawbacks. One problem with conventional visualization graphs using a non-deterministic approach is that entities are arranged in a random. Thus, the orientation within the graph is not optimal.

SUMMARY

Consistent with the present invention, a method of providing a visualization graph on a computer comprises storing data corresponding to a plurality of entities having a particular type, wherein a semantic net includes the entities and wherein the entities are linked to each other by a plurality of relations; in response to a query with respect to an entity selected from the plurality of entities, providing a visualization graph having a plurality of sectors representing the results of the query; and allocating the entities to a predetermined sector of the graph depending on their entity type. By allocating entities to a predetermined sector of the graph depending on their entity type, the location of the entity types can be predicted.

Consistent with the present invention, a computer for providing a visualization graph comprises a storage medium having recorded therein processor readable code processable to provide a visualization graph; a database for storing data corresponding to a plurality of entities having a particular type, wherein a semantic net includes the entities and wherein the entities are linked to each other by a plurality of relations; a query interface adapted, so that in response to a query with respect to an entity selected from the plurality of entities, a visualization graph is provided representing the results of the query, wherein the code comprises a plurality of attractor codes processable to attract the entities to a predetermined sector of the graph depending on their entity type.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 1:
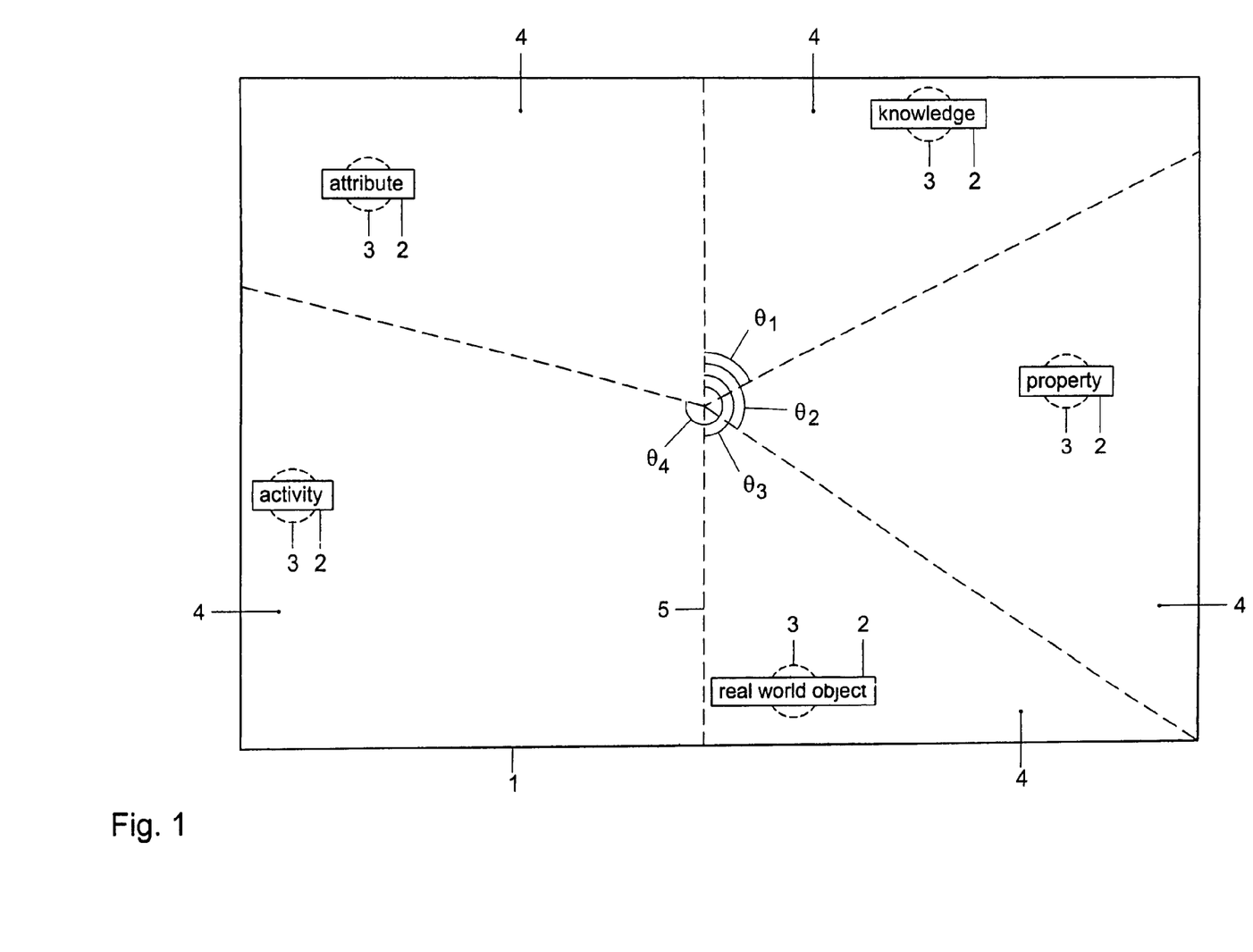
FIG. 1 shows a grouping in a visualization graph.
Figure 2:
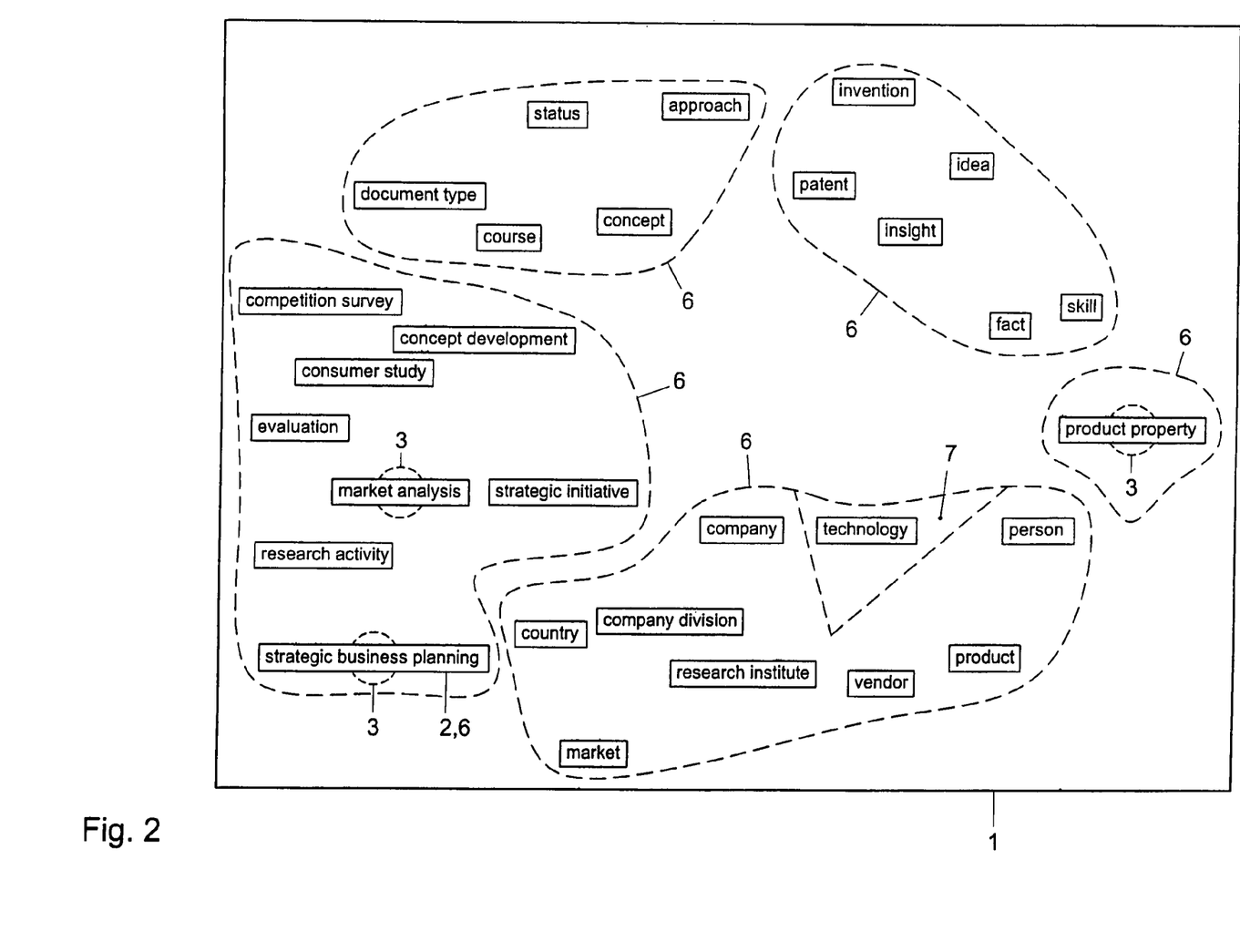
FIG. 2 shows further details of the visualization graph shown in FIG. 1.

FIGS. 1 and 2 show examples of embodiments of the present invention. In particular, FIG. 1 shows the position of attractors for top-level entity types, also referred to as "types" and FIG. 2 shows the approximate position of attractors for second-level entity types, also referred to as "sub-types." FIG. 1 shows details of a visualization graph 1 wherein a plurality of entities 2 are displayed. Associated with each entity is an attractor 3. The attractors do not appear on the graph to a user, but are schematically depicted as dotted circles 3.

The entities 2 are typically modelled as a mass. There is a repulsive force exerted by a repulsor between each pair of entities. The repulsive force may be inversely proportional to the distance or the square of the distance, or any other inverse relationship. The relations between entities (not shown in FIG. 1) are modelled as springs, typically linear springs. The model provides damping to ensure that the system converges.

When energy is put into the system, for example, when entities 2 are introduced into the graph or moved, the system is modelled to adopt the lowest energy level. For each entity or node (refer to FIG. 3), the distance and repulsive force is calculated from other entities and nodes. The forces are added to obtain a force vector. The reaction of the system in terms of acceleration and deceleration is dependent on the force vector. To facilitate orientation, certain types (or kinds) of entities 2 are arranged to appear in the same sector 4 of the graph 1.

A first embodiment is based on a non-deterministic approach, using attractors and repulsors. A second embodiment is based on a deterministic approach using a dynamic, but deterministic, subdivision of the screen and screen areas into sectors and sub-sectors, wherein entity types are allocated to sectors and entity sub-types are allocated to sub-sectors, respectively.

The first non-deterministic embodiment is now described. To facilitate orientation certain kinds, that is types, of entities 2 are arranged to appear in the same sector 4 of the graph. Invisible attractors 3 that are not visible to a user of the graph are introduced for each entity type. In the example, shown in FIG. 1 the types are "attribute," "knowledge," "property," "real world object," and "activity". These may be referred to as top-level entity types. The angle theta 1-theta 4 of each attractor 3 with respect to a reference may be set by customizing and is inherited by all subtypes (refer to FIG. 2 which depicts subtypes 6, wherein subtypes are entities 2 which have a type falling within the scope of a top-level type. For example, in FIG. 2 "strategic business planning" is a sub-type of "activity."

It is seen in FIGS. 1 and 2 that within each sector 4, 7 the entities to be placed are arranged in FIG. 1 in an ellipse, whereas in FIG. 2, because there are more entities to be arranged, and thus force vectors are more complex, in each sector 4, the sub-type entities, rather than being arranged in an ellipse are arranged in a more nebulous arrangement. Further, because the force vectors are more complex in FIG. 2, where a large number of entities are located in a relatively small area, the location of each entity does not correspond exactly to the location of its respective attractor, because the repulsive forces between entities also play a role in the location of the entity. Thus, FIG. 2 shows the approximate location of the attractors 3 as dotted lines.

It will be understood that the negotiation of sector size determined in accordance with the number of entities and how they are to be distributed causes the graph to have a particular fuzziness. As mentioned, this is achieved by the provision of the attractors 3. In contrast, in conventional graphs, there is no flexibility in the system to expand or contract a sector beyond or within its boundary, respectively, should the need arise when entities are either added or taken away from the sector.

The second deterministic embodiment is now described. The principle of the present invention may also be used to arrange nodes (refer to FIG. 2) in a navigation graph without the use of repulsors and/or attractors. According to an embodiment of the present invention, the following steps are carried out: the display, which is typically a computer screen, is divided into sectors 4 assigned to the respective top-level entity types 2. The size of each sector depends on the number of entities or nodes it contains, including all visible subtypes 6. For example, if a larger number of entities are to be placed in a particular sector, that sector will become larger. Then the sectors are recursively divided into subtype sectors 7 and again, their relative size depends on the number of entities they contain. The segmentation of the screen is repeated each time that entities are added to or removed from the graph 1.

The distance of the entities or nodes to the center of the graph is an oscillating function of the angle in order to avoid collisions (which in the simulative approach are avoided by the repulsive force between entities). It will be understood that whilst the first and second embodiments may be alternatively implemented, a combination of the first and second embodiments may also be implemented.

In one embodiment, if an additional entity of a particular entity type is stored in the storing step, the location on the graph of the allocated entities is adapted in accordance with the additional entity. In this way, the graph becomes dynamic and more versatile.

The method may include the further step of providing attractors 3 which attract the entities to the predetermined sector in accordance with their entity types. In doing so, a so-called "360° Navigation Graph" is achieved, whereby the location of each entity can be predicted without having to carry out a complete, and thus, very complex deterministic approach.

Further, the method may include the further step of providing repulsors to repulse the entities allocated to the predetermined sector 4 from one another. This achieves an optimization of the distribution of entities 2 within a sector 4. Further, the location of an entity 2 on the graph 1 may be determined by the sum of the influence exerted on the entity 2 by the attractor 3 and the repulsors.

In a further embodiment, the method may include the steps of: dividing the graph into sectors 4, wherein an entity 2 is allocated to one of the sectors 4 according to its entity type, and dividing the sectors 4 into sub-sectors 7, wherein an entity 2 is allocated to one of the sub-sectors 7 in accordance with its entity sub-type, wherein the size of the sectors 4 and the sub-sectors 7 is determined in accordance with the number of entities of a particular type allocated to the sector 4 and the number of entities of a particular sub-type allocated to the sub-sector 7, respectively. By doing this, a deterministic approach is realized without the complexity of conventional deterministic approaches.

In a yet further embodiment, the method may include the step of: repeating the dividing steps if the number of entities 2 to be displayed on the graph 1 changes. By doing so, a dynamic deterministic approach is realized, which is adaptive and versatile.

Figure 3:
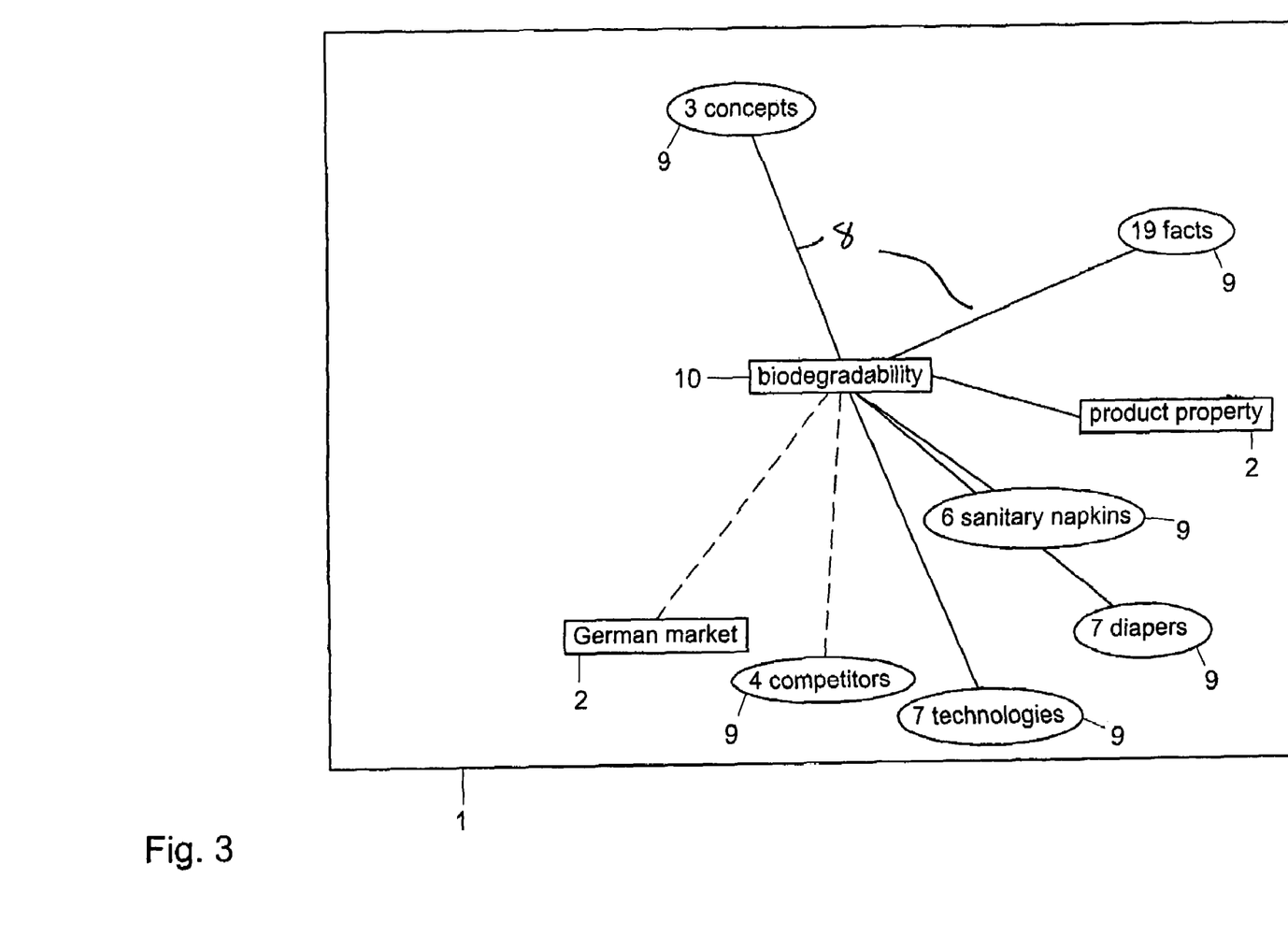
FIGS. 3-6 show visualization graphs according to embodiments of the present invention.

FIG. 3 shows a visualization graph according to further embodiments of the present invention. In particular, FIG. 3 shows a focus entity 10 with related entities 2 and those comprised in nodes 9, clustered by entity type. The dashed lines indicate indirectly related items, "competitors", "market", selected due to user preferences.

Figure 4:
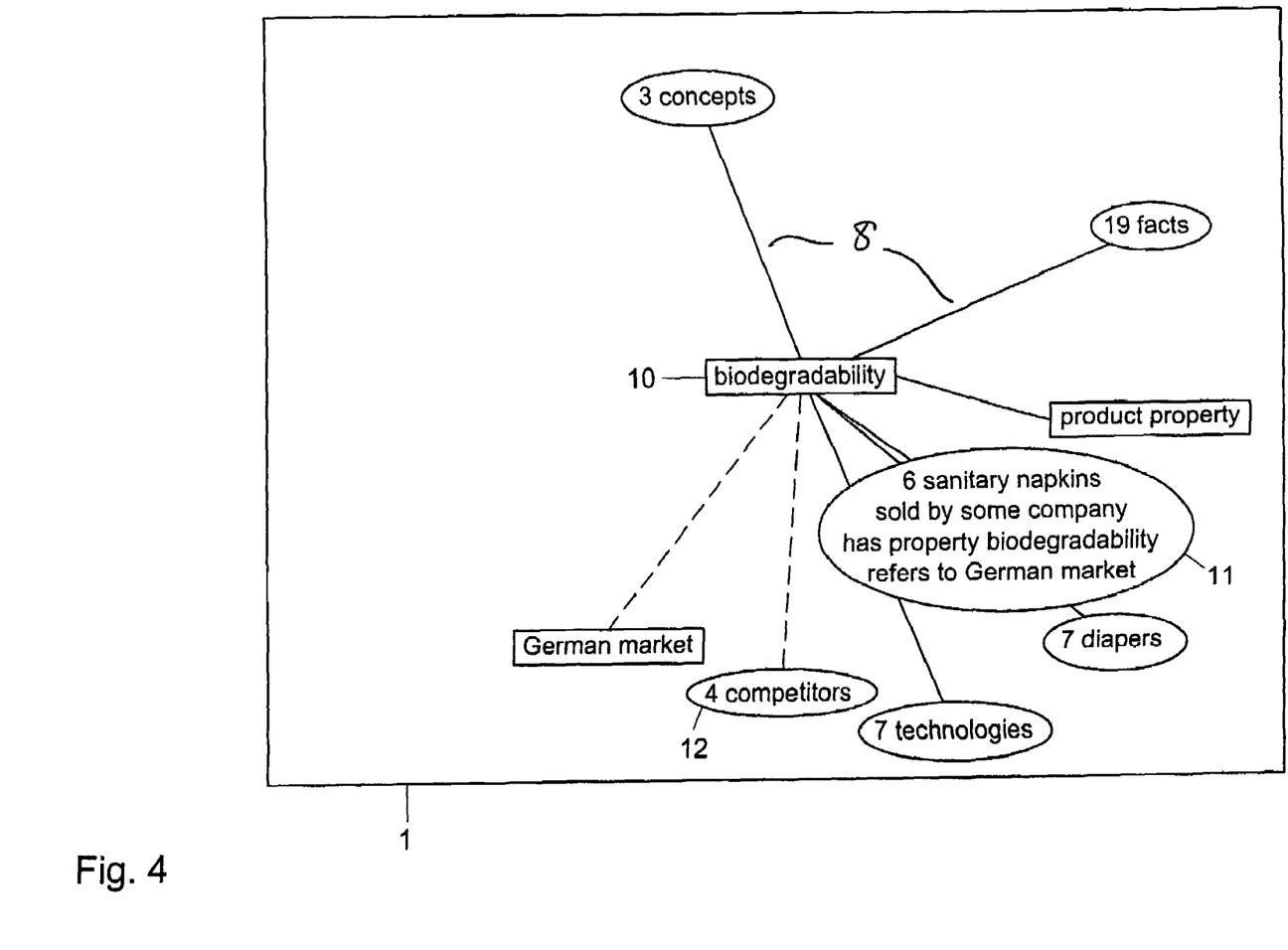

FIG. 4 shows further details of the visualization graph shown in FIG. 3. In particular, FIG. 4 depicts a display of a group's common relations 8 as indicated when a mouse, or other indicator adapted for use with a computer, is passed over the desired node (MouseOver).

As shown in FIGS. 3 and 4, to avoid a visualization graph 1 getting crowded and the data complex to navigate as a result, groups of entities 9 with common relations 8 are bundled and displayed as group nodes 9 (FIG. 3). Of all possible groupings those are selected which result in the most even distribution of entities 2 (also referred as elements) over the groups and which form groups of entities 2 (elements) which have at least two relations 8 in common.

The common relations 8 may be explicitly assigned to each entity in a group, but they may also be abstractions of the individual relations 8. This embodiment is shown in FIG. 4, where the common relations 8 of the group "sanitary napkins" are displayed: each of these products has got a relation 8 "refers to German market" and a relation 8 "has property biodegradability." These are direct relations 8. For example, a company having access to the graph sells two products in the group and competing companies sell the remaining products. Since the semantic net contains the information that all those are companies, a common abstract relation 8 "is sold by some company" is created, which also characterizes the elements of the group.

The selection code is dynamic resulting in a dynamic grouping of the entities. That is, depending on certain criteria such as the context, the selection and abstraction, if applied, may at different times provide different groupings. In a preferred embodiment, the method comprises the further step of selecting those entities from the plurality of entities having at least one common relation 8 and storing the selected entities as a plurality of groups, representing the groups on the graph as a plurality of nodes 9, and representing only those relations 8 which all of the nodes 9 have in common. By grouping of entities with common relations 8 and displaying the group as one node 9 (represented as an ellipse rather than a box in FIGS. 3 and 4) in the graph, and by providing lines representing only the relations 8 that all nodes in the graph have in common, an efficient representation of the entities and an efficient use of the graph is achieved. Further, characteristics are used to identify common relations 8 in such a way that a good distribution of nodes 9 is achieved.

In a preferred embodiment, a selecting step includes abstracting the relations 8 to find the common relation 8. By abstracting the relations 8, characteristics are used to identify common relations 8. In such a way that an even distribution of nodes in the graph is achieved.

In a further embodiment, to further improve the predictability of the selection, facets are introduced. In particular, in order to increase the predictability with regard to what common relation 8 will be chosen as criterion to form groups, the user may define facets for each entity type. Facets are predefined groups that are characterized by the entity type of their elements or the kind of relation 8 that connects their elements to the focus entity.

In the example, the following facets have been defined for product properties knowledge, products, technologies, persons, life cycle phases, companies, ideas, insights, facts, concepts, approaches, activities. If facets are defined, all entities related to the focus entity will be sorted into the corresponding facets (groups) and the dynamic grouping algorithm is used only to subdivide these facets into smaller groups (if possible).

Figure 5:
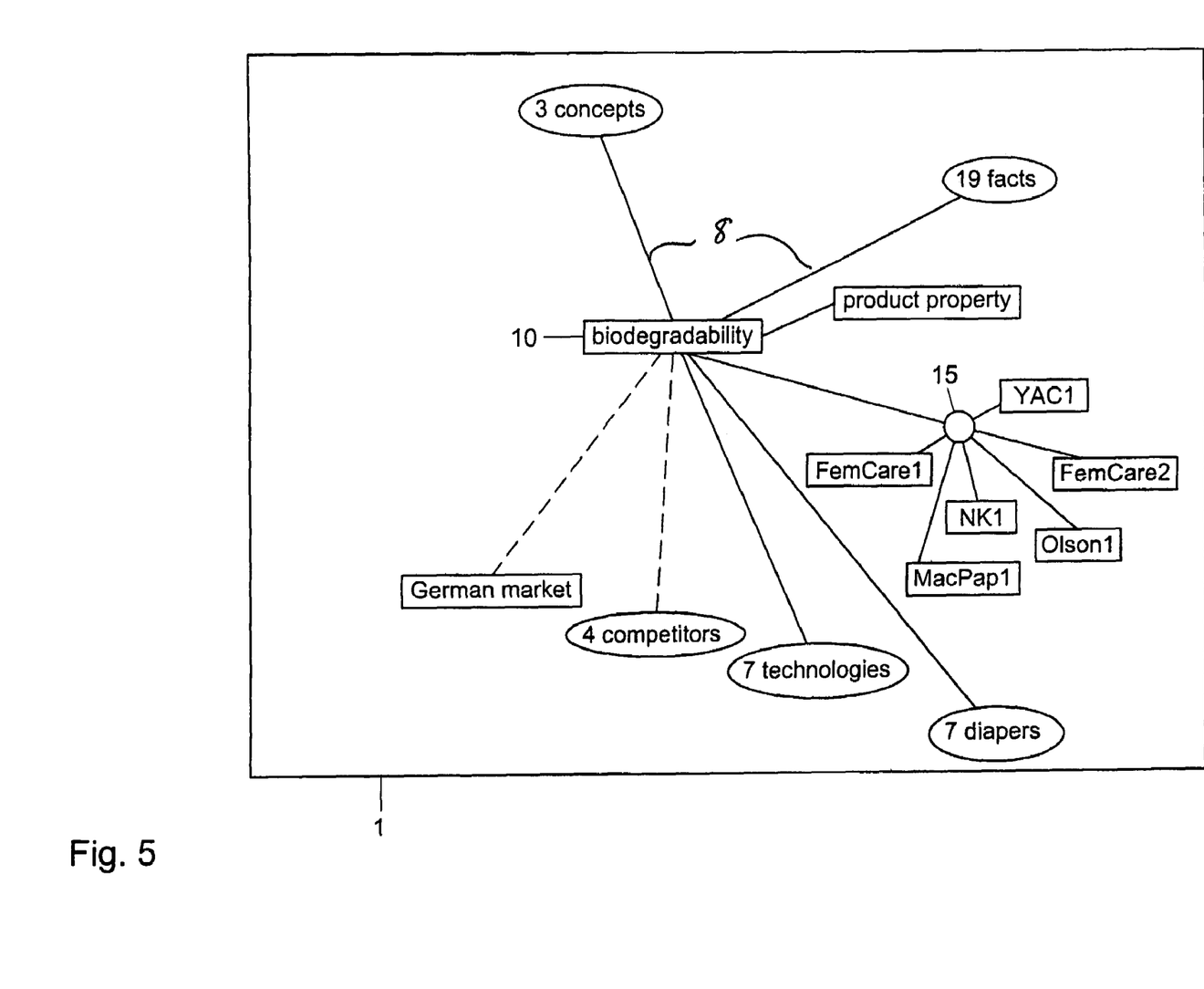
Figure 6:
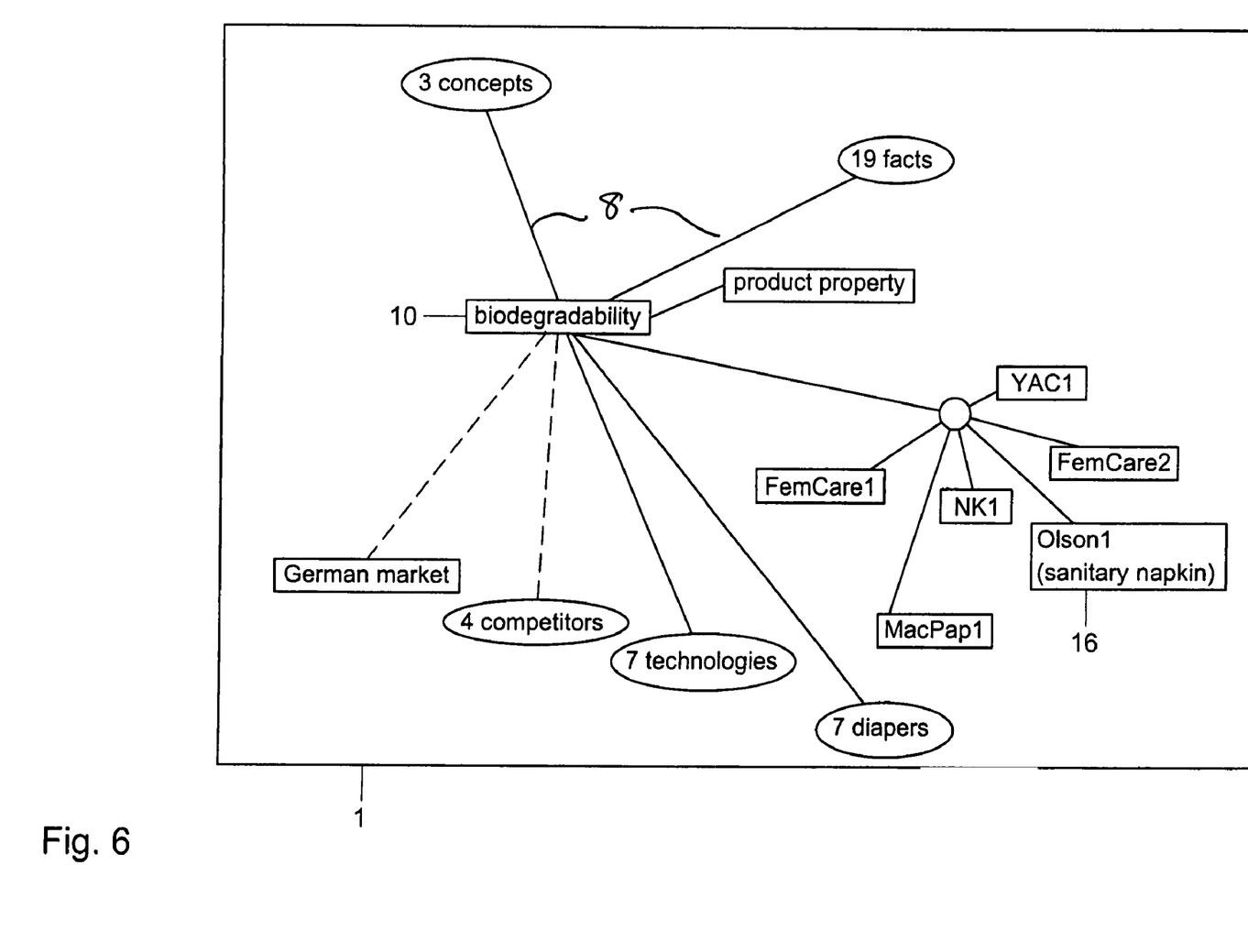
Figure 7:
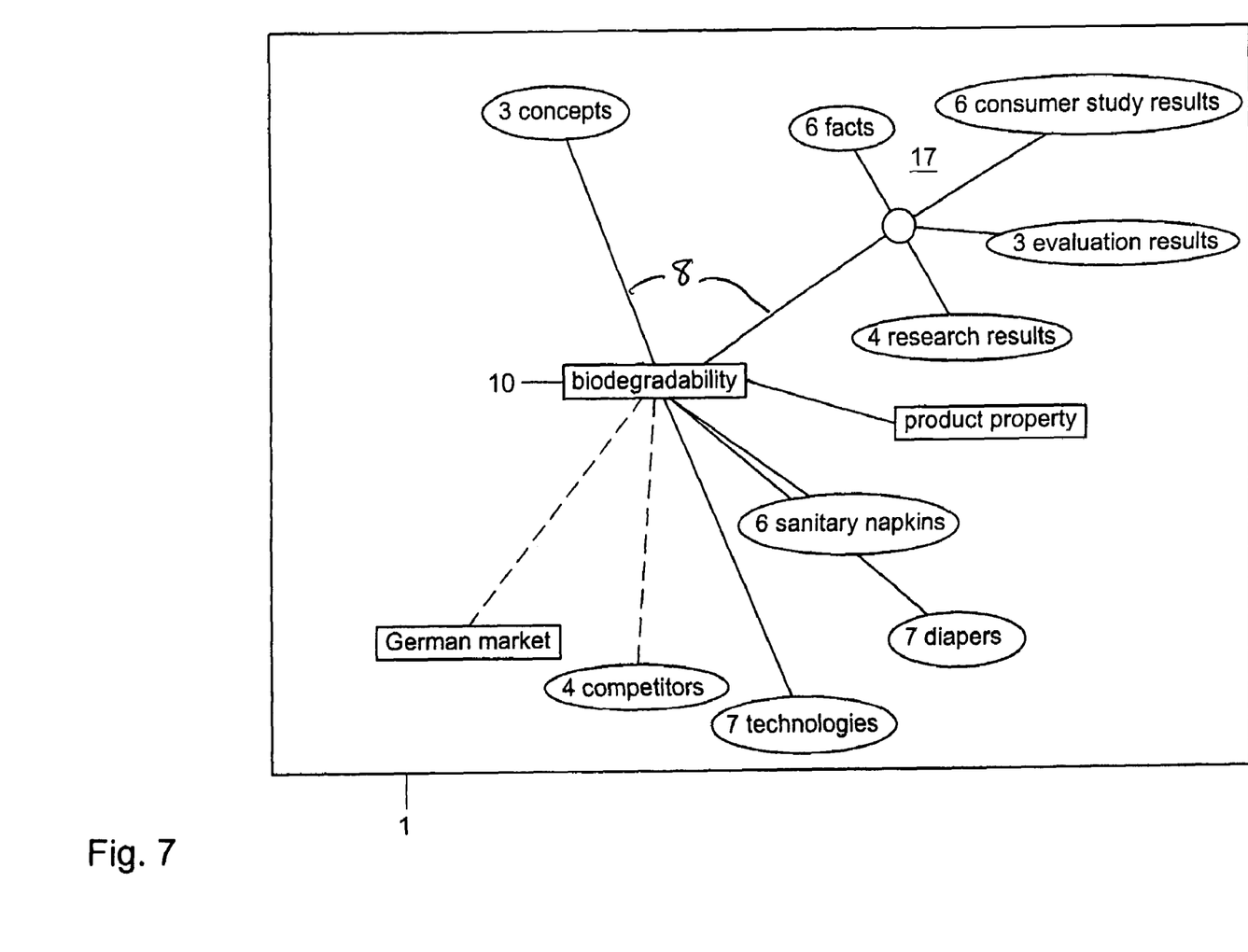
FIG. 7 shows a visualization graph according to a further embodiment of the present invention.
Figure 8:
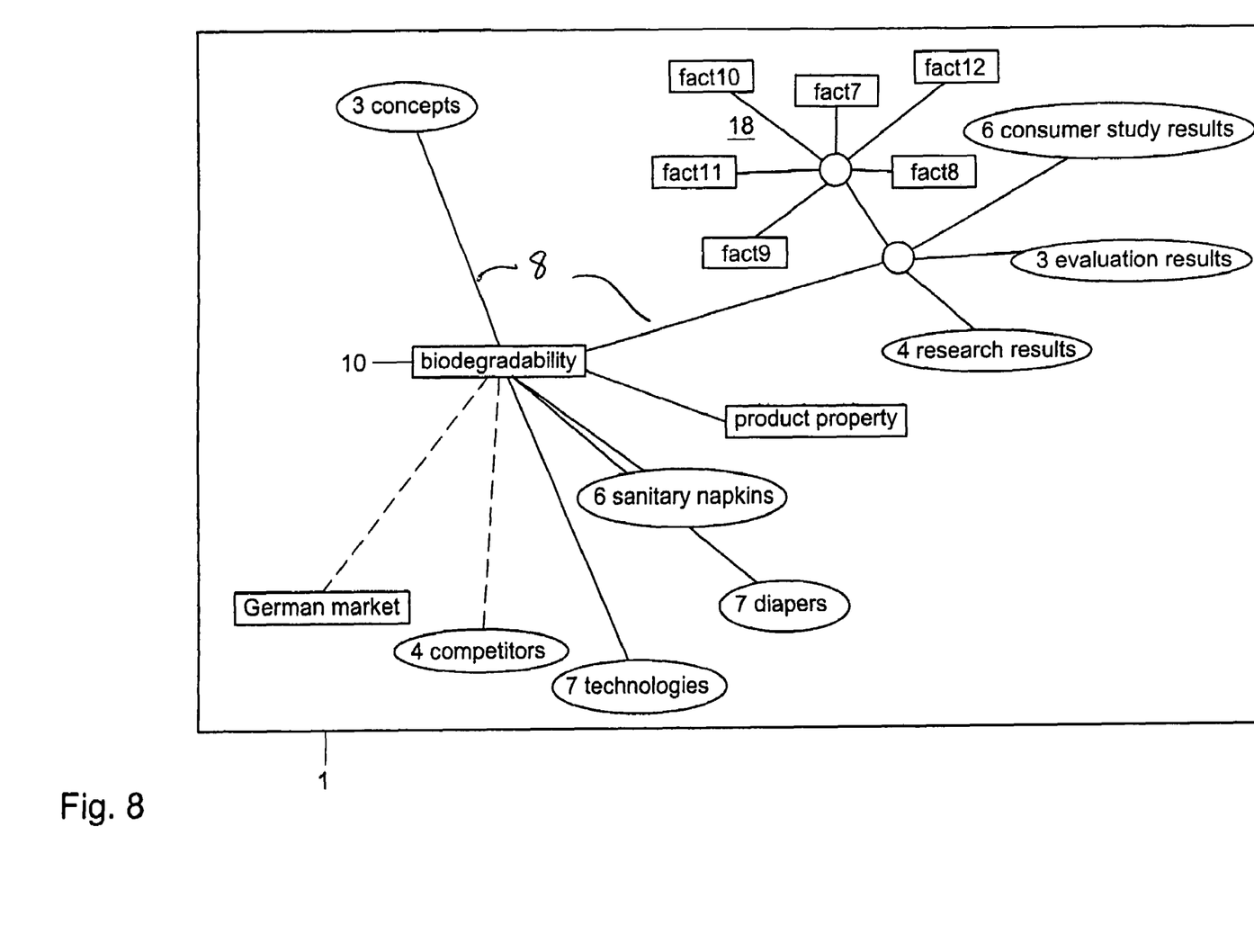
FIG. 8 shows further details of the visualization graph shown in FIG. 7.

FIGS. 5-8 show visualization graphs according to examples of further embodiments of the present invention. In particular, FIG. 5 depicts an exploding group 15, wherein association of members to group remains visible. FIG. 6 depicts a display of entity type 16 as viewed with the MouseOver function. FIG. 7 depicts an explosion of a group into subgroups 17. FIG. 8 depicts the explosion of a subgroup 18.

As mentioned, in contrast to conventional visualization graphs, an aspect of the present invention allows the formation of groups in a 2D visualization graph whilst keeping it clear. According to an embodiment of the present invention this is achieved by keeping the space required for the nodes minimal and the origin of the added nodes traceable. Further, the graph is rearranged in a smooth way to avoid confusion of the user.

According to an embodiment of the invention, the following steps are taken. Before exploding, the group node increases repulsive force proportionally to the number of entities to be inserted in order to make room for the new nodes. The actual insertion begins, when the neighbor nodes have moved sufficiently far away. Although the new nodes inserted into to the graph have a direct relation 8 to the "focus" node 10, this relation 8 is only displayed indirectly: the new entities are connected to the group node which remains in the graph as "bundler" without label and establishes the relation 8 to the "focus" node 10. Thus the number of lines connected to the center node 10 remains low.

While a group "bundler" node 11 doesn't have a label in order to save space, the group's characteristics are shown when the user moves the mouse pointer over the "bundler" node 11, in the same way as shown in FIG. 4.

Double-clicking a "bundler" node 11 causes group to collapse again into one node. The recursive explosion and collapsing of subgroups 18 is also possible (FIG. 7,8). The resulting representation looks and behaves similar to a "tree view control". The main difference is that a tree view represents an existing hierarchical structure, whereas the group nodes in the graph dynamically create a hierarchy-like structure in order to get a clearer graph layout. Also the problem of finding a 2D graph layout does not exist for conventional tree view controls.

In a particular embodiment, the method may include step of: representing a plurality of entities 2 having a common relation 8 as a first node 9 on the visualization graph 1, and in response to a predetermined stimulus causing the entities 2 comprised at the first node 9 to be displayed, and in response to a further predetermined stimulus causing the graph to restructure so that the entities displayed are replaced by the node 9. By providing the possibility to explode such groups (i.e. to display all group entities as separate nodes in the graph) by double-clicking and to put them back into the group again, links between nodes representing relations 8 are kept to a minimum which optimizes the energy in the graph. Further, it becomes easier for the user to orientate within the graph, thus, improving his navigation of the information represented in the graph.

In a preferred embodiment, in response to the first predetermined stimulus, the node 9 remains in the graph to represent the common relation 8. As a result even in the "exploded" state, the "group node" is kept in the graph and represents the common relations 8, while the single group members (entities) have a link to the group node. Further, the entities may be linked to a further entity or node via a link which represents a relation 8 which may not be common to all entities linked to the first node 9. By providing links that may not be common to all members of the group (linked by a common relation 8 to the first node), the user has access to further navigable information.

As mentioned, in contrast to conventional visualization graphs, certain embodiments of the present invention provide a visualization graph layout such that the number of nodes is kept low without missing out potentially relevant information.

According to an embodiment of the present invention this is achieved in the following way: when the focus of a graph changes, new related entities are inserted, and therefore other entities have to be removed. In conventional visualization graphs, only nodes in the graph are kept which have a distance $d < d_{max}$ from the focus node, where the distance is the number of relations 8 on the shortest path between a node and the focus node. Since the number of nodes usually increases exponentially with $d_{max}$, a value of 1 or 2 is appropriate for most purposes.

To enhance navigation of the visualization graph, entities of certain types may be included in the graph even if they are far more distant to the focus, if they are considered to be of special interest in the current context either due to their entity type or due to the kind of relations 8 linking them to the focus node.

The context information in this case can be made up, but is not limited, from the following components current user's general preferences, context information attached to the "focus" node, and current user's current role and/or session history. In FIGS. 3 to 8, the entity 2 "German market" and a group of "four competitors" 12 appear in the graph connected with dashed lines to the focus node 10. These entities 12 have no direct relation 8 to the product property "biodegradability," but are related via some products. In this case, the system has been told that if an entity of the type "product property" is in the focus, markets and competitors are of special interest. So all markets and competitors in a certain distance d<4 to the entity "biodegradability" are selected and inserted into the graph. More sophisticated algorithms may be applied to find entities of special interest and it is even possible to let the user create context specific algorithms by means of a scripting language or macro recorder.

According to a particular embodiment, the method may comprise the further steps of: storing 24 data corresponding to a plurality of entities and/or nodes 2, 9, wherein a semantic net includes the entities and/or nodes 2, 9 and wherein the entities and/or nodes 2, 9 are linked to each other by a plurality of relations 8, generating a query, performing the query on the data, and outputting at least two of the plurality of data in the form of a visualization graph 1 representing the results of the query, wherein the graph 1 has a focus entity or node 10 defined by a user or the query, and using context information to determine at least one entity and/or node to be output in the results which is indirectly related to the focus 10.

By providing the possibility to display entities that are indirectly related to the "focus" entity based on the current context and user preferences, the user is able to collect additional information even if there is no direct relationship between entities. Thus, allowing the user to "jump" from context to context within the graph. This embodiment of the present invention allows a user to find how large amounts of data are related. The user is able to navigate and explore knowledge domains in a visual way.

Figure 9:
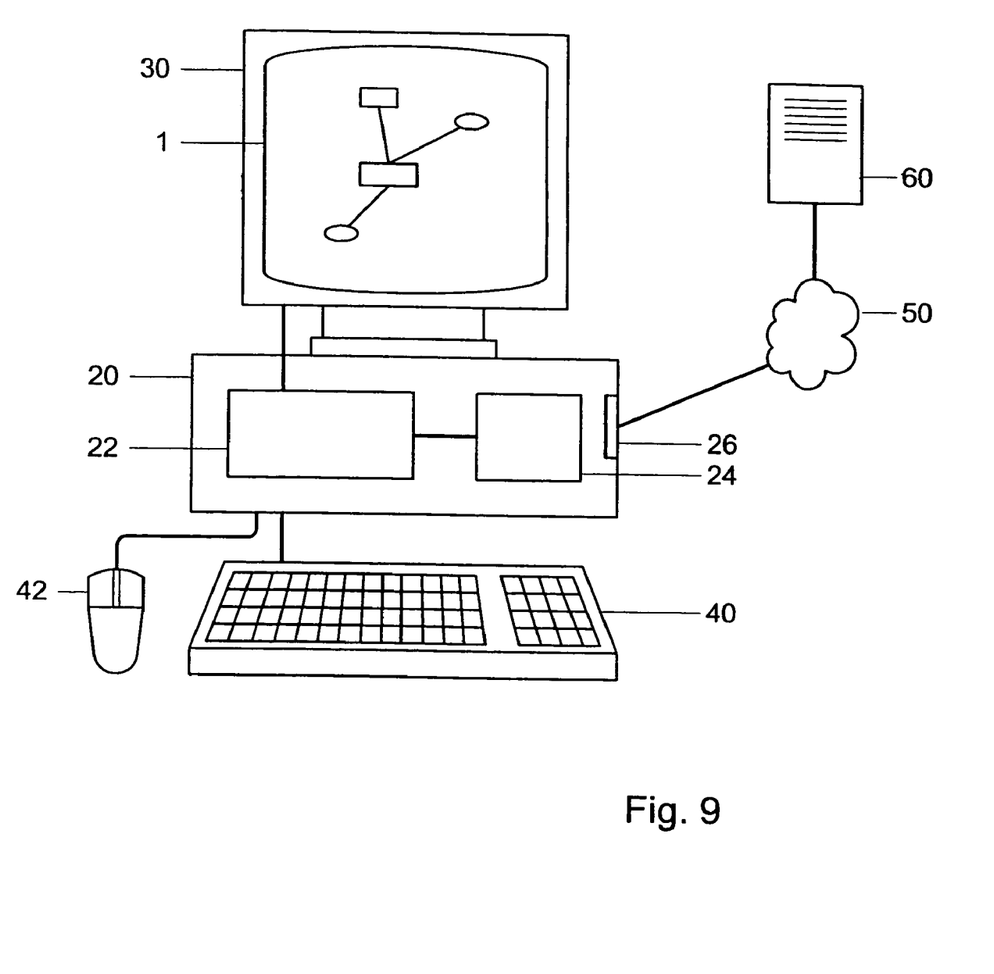
FIG. 9 shows an exemplary computer for carrying out the methods according to embodiments of the invention.

FIG. 9 shows a typical computer arrangement for carrying out the methods according to embodiments of the invention. In particular, FIG. 5 shows a computer 20 including a central processing unit (CPU) 22. The computer further includes a storage medium, which may be located in the CPU 22 and/or elsewhere. In the storage medium processor readable code is stored, which may be read by the CPU 22 to provide a visualization graph. Various codes may be stored an allocator code processable to allocate the entities to a predetermined sector of the graph depending on their entity type, additional entity allocator code processable so that if an additional entity of a particular entity type is stored in a storing step, the location on the graph of the allocated entities is adapted in accordance with the additional entity. The allocator code may include a plurality of attractor codes processable to attract the entities to a predetermined sector of the graph depending on their entity type, respectively, a plurality of repulsor codes processable to repulse the entities allocated to the predetermined sector from one another. The attractor codes and the repulsor codes are processable so that the location of an entity on a graph is determined by the sum of the influence exerted on the entity by the attractor code and the repulsor codes.

The allocator code may further comprise dividing code processable to divide the graph into sectors, wherein an entity is allocated to one of the sectors according to its entity type, and further dividing code processable to further divide the sectors into sub-sectors, wherein an entity is allocated to one of the sub-sectors in accordance with its entity sub-type, wherein the size of the sectors and the sub-sectors is determined in accordance with the number of entities of a particular type allocated to the sector and the number of entities of a particular sub-type allocated to the sub-sector, respectively.

The allocator code may also include repeater code processable to activate the dividing code if the number of entities to be displayed on a graph changes. The processable code may further comprise selection code processable to select those entities from the plurality of entities having a common relation 8 and storing the selected entities as a plurality of groups, representation code processable to represent the groups on the graph as a plurality of nodes, wherein only those relations 8 which all of the nodes have in common are represented.

In further embodiments of the present invention, the code may also include representation code processable to represent a plurality of entities having a common relation 8 as a node on a visualization graph, and in response to a predetermined stimulus causing the entities comprised at the node to be displayed, and in response to a further predetermined stimulus causing a graph to restructure so that the entities displayed are replaced by the node. Also provided is a display device 30, such as a screen, for displaying a visualization graph 1.

The user may use a keyboard 40, mouse 42 or other operating device to communicate with the computer 20 and to instruct the computer to perform a query. The query may be generated automatically or by a user. Context information may be defined in the query. Alternatively, it may not form part of the query, and may be defined in some other way, for example, by user preferences.

In one embodiment, a computer 20 is provided for providing a visualization graph 1, the computer 20 may comprise: a database 24, 60 for storing data corresponding to a plurality of entities and/or nodes 2, 9, wherein a semantic net includes the entities and/or nodes 2, 9 and wherein the entities and/or nodes 2, 9 are linked to each other by a plurality of relations 8, a storage medium 22 having recorded therein processor readable code processable to provide a visualization graph 1, the code including a query code processable to perform a query on the database, an output device 30 for outputting at least two of the plurality of data in the form of a visualization graph 1 representing the results of the query, wherein the graph 1 has a focus entity or node 10 defined by a user or the query, wherein the code further includes context code processable to express context information which is processable to determine at least one entity and/or node to be output in the results which is indirectly related to the focus 10.

Further, the context code may be processable to allow at least one entity 2 and/or node 9 to be output in the results that are indirectly related by more than two relations 8. The context code may also be processable to enable identification of at least one entity and/or node 2, 9 having a particular interest with respect to the focus 10, and/or may be processable to identify a particular interest on the basis of an entity 2 or node 9 type or due to the relations 8 linking the entity and/or node 2, 9 to the focus 10. Further, the context code may be determined by any or a combination of: at least one predetermined user preference, information associated with the focus, or a user's current role and/or session history query.

In one embodiment, the database 24 in which data for building the graph is stored, may be located locally at the computer 20. Alternatively or in addition, the database 60 or an additional database may be located remotely from the computer 20. In such an embodiment, the computer is provided with means to remotely access a remote database. For example, using a modem 26 connected via the Internet 50 or other network or communications link to the remote database 60. Although the embodiment shown in FIG. 9 is a typical Internet configuration, other configurations may also be possible. As mentioned, a stand-alone configuration is also envisaged. Further, the database may be distributed over more than one computer. While parts of the processing may be performed on the user's computer, other parts of the processing may be performed remotely at a remote computer.

In the embodiments of the present invention described above, the visualization graph is concerned with aspects of company dealing with personal hygiene products. However, the invention is not limited in this respect. The present invention finds application in any sphere where data is to be navigated. In particular, where complex interrelationships of data are to be navigated. Further applications are found where data in one or more databases is somehow related to one another. Further applications include Internet applications, where metadata is accessed and used. The expression "visualization graph" is intended to cover visual representations, such as navigation graphs and other such tools.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method of providing a visualization graph on a computer with memory, a processor, and a display device, the method comprising:
    storing data in the memory corresponding to a plurality of entities having a particular type, wherein a semantic net includes the entities and wherein the entities are linked to each other by a plurality of relations;
    providing, by executing a process in the processor, a visualization graph on the display device in response to a query with respect to an entity selected from the plurality of entities, wherein the visualization graph includes:
        a first of the entities, representing results of the query, displayed because it is a focus entity defined by the user or the query
        a second of the entities, representing the results of the query, displayed because it is directly related to the focus entity, wherein a third of the entities, representing the results of the query, is not displayed because it is indirectly related to the focus entity;
        a fourth of the entities, representing the results of the query, that is indirectly related to the focus entity, wherein context information is used to determine that the fourth entity be displayed;
        a plurality of sectors representing the results of the query, the plurality of sectors being subdivisions of a screen area with boundaries;
        a plurality of sub-sectors being subdivisions inside the boundaries of the plurality of sectors, the subsectors also having boundaries, wherein a size of a predetermined one of the plurality of sub-sectors depends on a number of the entities allocated to the predetermined sub-sector,
    wherein a predetermined one of the plurality of sectors has a size that depends on a number of the entities allocated to the predetermined sector and the number of the entities allocated to the predetermined sub-sector;
    displaying the entities inside the boundaries of the predetermined sector and the boundaries of the predetermined sub-sector of the visualization graph depending on an entity type and entity sub-type of the allocated entities, respectively; and
    providing an invisible attractor in the predetermined sector, which attracts a subset of the entities to the predetermined sector depending on the entity type of the subset of entities, wherein the invisible attractor remains invisible during user interaction with the visualization graph.

2. The method according to claim 1, wherein if an additional entity of a particular entity type is stored in the storing step, the location on the graph of the allocated entities is adapted in accordance with the additional entity.

3. The method according to claim 1, comprising:
    providing repulsors to repulse the entities allocated to the predetermined sector from one another.

4. The method according to claim 1, wherein the location of an entity on the graph is determined by a sum of the influence exerted on the entity by the attractor and the repulsors.

5. The method according to claim 1, comprising:
    reallocating the plurality of sectors and the plurality of sub-sectors in the visualization graph if the number of entities to be displayed on the graph changes.

6. The method according to claim 1, comprising:
    selecting entities from the plurality of entities having at least one common relation and storing the selected entities as a plurality of groups;
    representing the groups on the graph as a plurality of nodes; and
    representing only the relations which all of the nodes share in common.

7. The method according to claim 6, wherein the selecting step includes abstracting the relations to find the common relation.

8. The method according to claim 1, comprising:
    representing a plurality of entities having a common relation as a first node on the visualization graph;
    causing the entities comprised at the first node to be displayed in response to a predetermined stimulus; and
    causing the graph to restructure so that the entities displayed are replaced by the node in response to a further predetermined stimulus.

9. The method according to claim 8, wherein in response to the first predetermined stimulus, the node remains in the graph to represent the common relation.

10. The method according to claim 8, wherein the entities are linked to a further entity or node via a link which represents a relation that is not common to all entities linked to the first node.

11. The method according to claim 1, wherein a distance of the entities from a center of the visualization graph is an oscillating function of an angle of the predetermined sector in order to avoid collisions.

12. A computer for providing a visualization graph, the computer comprising:
- a storage medium having recorded therein processor readable code processable to provide a visualization graph;
- a database for storing data corresponding to a plurality of entities having a particular type, wherein a semantic net includes the entities and wherein the entities are linked to each other by a plurality of relations;
- a query interface adapted, so that in response to a query with respect to an entity selected from the plurality of entities, a visualization graph is provided representing the results of the query, wherein the code comprises an allocator code processable to:
  - allocate a first of the entities, representing results of the query, displayed because it is a focus entity defined by the user or the query;
  - allocate a second of the entities, representing the results of the query, displayed because it is directly related to the focus entity, wherein a third of the entities, representing the results of the query, is not displayed because it is indirectly related to the focus entity;
  - allocate a fourth of the entities, representing the results of the query, that is indirectly related to the focus entity, wherein context information is used to determine that the fourth entity be displayed;
  - allocate a first set of the entities to a predetermined sector of the graph depending on an entity type, the predetermined sectors being subdivisions of a screen area with boundaries;
  - allocate a second set of the entities to a predetermined sub-sector being a subdivision inside the boundaries of the predetermined sector depending on an entity sub-type, the sub-sectors also having boundaries, wherein a size of the predetermined sub-sector depends on a number of the second set of entities allocated to the predetermined sub-sector,
  - wherein the predetermined sector has a size that depends on a number of the first set of the entities allocated to the predetermined sector and the number of the second set of the entities allocated to the predetermined sub-sector; and
  - provide an invisible attractor in the predetermined sector, which attracts a subset of the entities to the predetermined sector depending on the entity type of the subset of entities, wherein the invisible attractor remains invisible during user interaction with the visualization graph.

13. The computer according to claim 12, wherein if an additional entity of a particular entity type is stored in the storing step, the location on the graph of the allocated entities is adapted in accordance with the additional entity.

14. The computer according to claim 12, wherein the allocator code comprises a plurality of repulsor codes processable to repulse the entities allocated to the predetermined sector from one another.

15. The computer according to claim 12, wherein the location of an entity on the graph is determined by a sum of the influence exerted on the entity by the attractor code and the repulsor codes.

16. The computer according to claim 12, wherein the allocator code comprises repeater code processable to reallocate the plurality of sectors and the plurality of sub-sectors in the visualization graph if the number of entities to be displayed on the graph changes.

17. The computer according to claim 12, wherein the code further comprises selection code processable to select entities from the plurality of entities having a common relation and storing the selected entities as a plurality of groups and representation code processable to represent the groups on the graph as a plurality of nodes, wherein only relations for which all of the nodes share in common are represented.

18. The computer according to claim 12, wherein the code further comprises representation code processable to represent a plurality of entities having a common relation as a node on the visualization graph, and in response to a predetermined stimulus causes the entities comprised at the node to be displayed, and in response to a further predetermined stimulus causes the graph to restructure so that the entities displayed are replaced by the node.

19. The computer according to claim 12, wherein a distance of the entities from a center of the visualization graph is an oscillating function of an angle of the predetermined sector in order to avoid collisions.

20. A program storage device readable by a processing apparatus, the device embodying instructions executable by the processor to perform the steps of:
- storing data corresponding to a plurality of entities having a particular type, wherein a semantic net includes the entities and wherein the entities are linked to each other by a plurality of relations;
- providing a visualization graph in response to a query with respect to an entity selected from the plurality of entities, wherein the visualization graph includes:
  - a first of the entities, representing results of the query, displayed because it is a focus entity defined by the user or the query;
  - a second of the entities, representing the results of the query, displayed because it is directly related to the focus entity, wherein a third of the entities, representing the results of the query, is not displayed because it is indirectly related to the focus entity;
  - a fourth of the entities, representing the results of the query, that is indirectly related to the focus entity, wherein context information is used to determine that the fourth entity be displayed;
  - a plurality of sectors representing the results of the query, the plurality of sectors being subdivisions of a screen area with boundaries;
  - a plurality of sub-sectors being subdivisions inside the boundaries of the plurality of sectors, wherein a size of a predetermined one of the plurality of sub-sectors depends on a number of the entities allocated to the predetermined sub-sector,
  - wherein a predetermined one of the plurality of sectors has a size that depends on a number of the entities allocated to the predetermined sector and the number of the entities allocated to the predetermined sub-sector;
- displaying the entities inside the boundaries of the predetermined sector and boundaries of the predetermined sub-sector of the visualization graph depending on an entity type and entity sub-type of the allocated entities, respectively; and
- providing an invisible attractor in the predetermined sector, which attracts a subset of the entities to the predetermined sector depending on the entity type of the subset of entities, wherein the invisible attractor remains invisible during user interaction with the visualization graph.

* * * * *